(12) United States Patent
Xia

(10) Patent No.: US 9,432,358 B2
(45) Date of Patent: Aug. 30, 2016

(54) SYSTEM AND METHOD OF AUTHENTICATING USER ACCOUNT LOGIN REQUEST MESSAGES

(71) Applicant: Tencent Technology (Shenzhen) Company Limited, Shenzhen (CN)

(72) Inventor: Dongming Xia, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 280 days.

(21) Appl. No.: 14/460,247

(22) Filed: Aug. 14, 2014

(65) Prior Publication Data

US 2015/0121491 A1 Apr. 30, 2015

Related U.S. Application Data

(63) Continuation of application No. PCT/CN2014/078878, filed on May 30, 2014.

(30) Foreign Application Priority Data

Oct. 31, 2013 (CN) .......................... 2013 1 0535171

(51) Int. Cl.
*H04L 29/06* (2006.01)
(52) U.S. Cl.
CPC .................................. *H04L 63/083* (2013.01)
(58) Field of Classification Search
None
See application file for complete search history.

(56) References Cited

U.S. PATENT DOCUMENTS

| 7,886,155 B2* | 2/2011 | Fiske | G06F 21/34 713/184 |
| 8,024,576 B2* | 9/2011 | Gargaro | G06Q 20/382 705/64 |
| 2006/0136740 A1* | 6/2006 | Smith | G06F 21/31 713/184 |

(Continued)

FOREIGN PATENT DOCUMENTS

CN 101404655 A 4/2009

OTHER PUBLICATIONS

Tencent Technology, ISRWO, PCT/CN2014/078878, Sep. 2, 2014, 6 pgs.

(Continued)

*Primary Examiner* — Farid Homayounmehr
*Assistant Examiner* — Henry Tsang
(74) *Attorney, Agent, or Firm* — Morgan, Lewis & Bockius LLP

(57) ABSTRACT

A computer server receives a login request message sent by a remote terminal to access a user account. If the message includes a first login key, the server then generates a second login key and executes a user account login process after confirming that the second login key corresponds to the first login key. If the message includes no login key, the server generates a verification code and returns the verification code to the remote terminal. The remote terminal then prompts a user to return the verification code to the computer server in a predefined format. If the returned verification code corresponds to the server-generated verification code, the server then executes the user account login process. The server also generates a third login key and returns the third login key to the remote terminal. The remote terminal then stores a correspondence relationship between the username and the third login key.

18 Claims, 9 Drawing Sheets

(56) References Cited

U.S. PATENT DOCUMENTS

| | | | |
|---|---|---|---|
| 2007/0022301 A1* | 1/2007 | Nicholson | G06Q 20/02 |
| | | | 713/184 |
| 2007/0180504 A1* | 8/2007 | Hung | G06F 21/335 |
| | | | 726/5 |
| 2008/0034411 A1* | 2/2008 | Aoyama | G06F 21/305 |
| | | | 726/5 |
| 2008/0276098 A1 | 11/2008 | Florencio et al. | |
| 2013/0067229 A1 | 3/2013 | German et al. | |
| 2013/0179692 A1* | 7/2013 | Tolba | H04L 63/08 |
| | | | 713/179 |
| 2014/0157381 A1* | 6/2014 | Disraeli | G06F 21/31 |
| | | | 726/7 |

OTHER PUBLICATIONS

Tencent Technology, IPRP, PCT/CN2014/078878, May 3, 2016, 4 pgs.

* cited by examiner

SYSTEM AND METHOD OF AUTHENTICATING USER ACCOUNT LOGIN REQUEST MESSAGES

RELATED APPLICATIONS

This application is a continuation application of PCT Patent Application No. PCT/CN2014/078878, entitled "SYSTEM AND METHOD OF AUTHENTICATING USER ACCOUNT LOGIN REQUEST MESSAGES" filed on May 30, 2014, which claims priority to Chinese Patent Application No. 201310535171.X, entitled "USER ACCOUNT LOGIN METHOD AND APPARATUS," filed on Oct. 31, 2013, both of which are incorporated by reference in their entirety.

TECHNICAL FIELD

The present application relates to the field of Internet communications, and particularly to system and method for authenticating user account login request messages.

BACKGROUND

On the Internet, a user can use a username and a password to log into a user account that the user has registered at a server. That is, a user sends a login request message carrying a username and a password to a server, the server acquires a corresponding password according to the username carried in the login request message, and if the acquired password is identical with the password carried in the login request message, the user is allowed to log into the user's corresponding user account.

At present, some lawbreakers can use the above login process to acquire a user's username and password, which poses a threat to account security, and the lawbreakers can take advantage of a loophole on a server to acquire a large number of usernames and a lot of passwords, and then try out a password corresponding to each username from a lot of passwords through a user account hacking program. For any username, the user account hacking program can select a password and send a login request message carrying the username and the selected password to the server to request logging into the server. If the login succeeds, the selected password is found to be the password corresponding to the username. If the login fails, another password is selected.

During the process of implementing the present application, the user account hacking program can use the existing user account login method to try out a user's username and password, which poses a great threat to the user's account security.

SUMMARY

The above deficiencies and other problems associated with the conventional approach of authenticating user account login requests are reduced or eliminated by the present application disclosed below. In some embodiments, the present application is implemented in a computer server that has one or more processors, memory and one or more modules, programs or sets of instructions stored in the memory for performing multiple functions and communicating with a remote terminal (e.g., a smartphone, a tablet, or a laptop) that has one or more processors, memory and one or more modules, programs or sets of instructions stored in the memory for performing multiple functions. Instructions for performing these functions may be included in a computer program product stored in a non-transitory computer readable storage medium and configured for execution by one or more processors.

One aspect of the present application involves a method for authenticating a login request from a remote terminal performed at a computer server having one or more processors and memory storing one or more program modules to be executed by the one or more processors. The computer server receives a login request message sent by a remote terminal to access a user account. The login request message includes a first field for carrying a username, a second field for carrying a password and a third field for carrying a login key. The computer server determines whether there is a first login key found in the third field of the login request message. If the first login key is found, the computer server then generates a second login key by applying a preset key generation algorithm to the username and compares the second login key with the first login key. If the second login key corresponds to the first login key, the computer server then executes a user account login process using the username and the password. If there is no login key found in the third field of the login request message, the computer server then generates a verification code and returns the verification code to the remote terminal. After receiving the verification code, the remote terminal then prompts a user of the remote terminal to return the verification code to the computer server in a predefined format. If the returned verification code corresponds to the server-generated verification code, the computer server then executes the user account login process using the username and the password. The computer server also generates a third login key by applying the preset key generation algorithm to the username and returns the third login key to the remote terminal. The remote terminal then stores a correspondence relationship between the username and the third login key in its memory.

Another aspect of the present application involves a computer server including one or more processors; memory; and one or more program modules stored in the memory and to be executed by the one or more processors. The program modules further include instructions for: receiving a login request message sent by a remote terminal to access a user account, where the login request message includes a first field for carrying a username, a second field for carrying a password and a third field for carrying a login key; in accordance with a determination that there is a first login key found in the third field of the login request message: generating a second login key by applying a preset key generation algorithm to the username; and executing a user account login process using the username and the password after confirming that the second login key corresponds to the first login key found in the third field of the login request message; in accordance with a determination that there is no login key found in the third field of the login request message: generating a verification code and returning the verification code to the remote terminal, wherein the remote terminal is configured to prompt a user of the remote terminal to return the verification code to the computer server in a predefined format; executing the user account login process using the username and the password after confirming that the returned verification code corresponds to the server-generated verification code; generating a third login key by applying the preset key generation algorithm to the username; and returning the third login key to the remote terminal, wherein the remote terminal is configured to store a correspondence relationship between the username and the third login key.

Another aspect of the present application involves a non-transitory computer readable storage medium having stored therein one or more program modules for execution by one or more processors of a computer server. The one or more program modules include instructions for: receiving a login request message sent by a remote terminal to access a user account, where the login request message includes a first field for carrying a username, a second field for carrying a password and a third field for carrying a login key; in accordance with a determination that there is a first login key found in the third field of the login request message: generating a second login key by applying a preset key generation algorithm to the username; and executing a user account login process using the username and the password after confirming that the second login key corresponds to the first login key found in the third field of the login request message; in accordance with a determination that there is no login key found in the third field of the login request message: generating a verification code and returning the verification code to the remote terminal, wherein the remote terminal is configured to prompt a user of the remote terminal to return the verification code to the computer server in a predefined format; executing the user account login process using the username and the password after confirming that the returned verification code corresponds to the server-generated verification code; generating a third login key by applying the preset key generation algorithm to the username; and returning the third login key to the remote terminal, wherein the remote terminal is configured to store a correspondence relationship between the username and the third login key.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions and advantages of the present application comprehensible, embodiments of the present application are further described in detail below with reference to the accompanying drawings.

Embodiment 1

Figure 1:
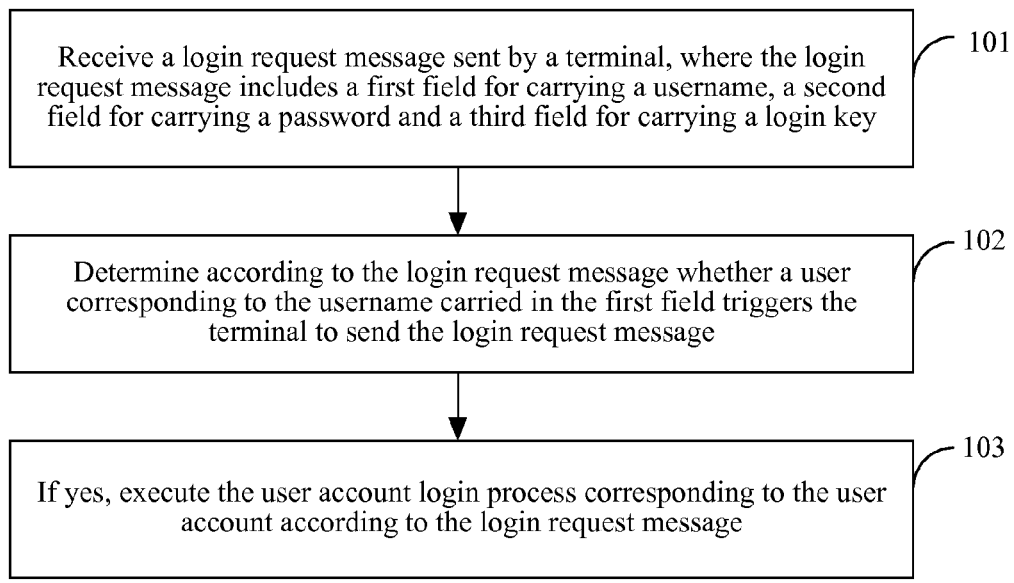
FIG. 1 is a flow chart of a user account login method according to Embodiment 1 of the present application.

Referring to FIG. 1, this embodiment of the present application provides a user account login method performed at a computer server having one or more processors and memory for storing program modules to be executed by the one or more servers, including:

Step 101: the computer server receiving a login request message sent by a remote terminal, where the login request message includes a first field for carrying a username, a second field for carrying a password and a third field for carrying a login key;

Step 102: the computer server determining according to the login request message whether a user corresponding to the username carried in the first field triggers the terminal to send the login request message; and Step 103: if yes, the computer server executing the user account login process corresponding to the username according to the login request message.

Preferably, the determining according to the login request message whether a user corresponding to the username carried in the first field triggers the terminal to send the login request message includes:

the computer server determining whether the third field carries a first login key, where the username of the user corresponds to a login key, and the login key corresponding to the username is generated by a server according to the username of the user through a preset key generation algorithm when the user logs into the user account on the terminal for the first time;

if the third field carries a first login key, the computer server generating a second login key by applying a preset key generation algorithm to the username; and the computer server comparing the second login key with the first login key, and if the second login key corresponds to the first login key, e.g., if they are the same, determining that the user corresponding to the username carried in the first field triggers the terminal to send the login request message.

Further, the method further includes:

if the third field does not carry a login key, the computer server generates a verification code and verifying according to the verification code whether the login request message is generated by a user account hacking program.

In some embodiments, the computer server performs verification by returning the verification code to the remote terminal. As described below, upon receipt of the verification code, the remote terminal displays an alert message on its display including the verification code and prompts the user of the terminal to enter the verification code through the user input device of the terminal in a predefined format. For example, the user may be prompted to type the verification code (e.g., a character string) into the terminal and the terminal then returns the user input to the computer server in the format of a character string. Alternatively, the user may be prompted to read the verification code (e.g., a sentence or a movie title or a song name or a current time or location of the terminal) so that the terminal can record the user's reading in an audio file and returns the verification code in the format of an audio file.

If the returned verification code corresponds to the server-generated verification code, the server then executes the user account login process using the username and the password so that the user at the remote terminal can access the user account associated with the username.

Further, the method further includes:

if the terminal is not a user account hacking program, the computer server generating a third login key by applying a preset key generation algorithm to the username, and sending the third login key to the terminal. Upon receipt of the third login key, the remote terminal generates and stores therein a correspondence relationship between the username and the third login key.

In this embodiment of the present application, a login request message sent by a terminal is received, where the login request message includes a first field for carrying a username, a second field for carrying a password and a third field for carrying a login key; it is determined according to the login request message whether a user corresponding to the username carried in the first field triggers the terminal to send the login request message; and if yes, the user account login process corresponding to the user account is executed according to the login request message. As it can be determined according to the login request message whether the user corresponding to the username carried in the first field triggers the terminal to send the login request message, it can be further determined whether the login request message is generated by a user account hacking program, so as to prevent a user account hacking program from taking advantage of an existing login method to try out a user's username and password, thereby protecting the user's account security.

In some embodiments, the computer server configures itself such that there are different terminals authorized for accessing the same user account during different time windows of a day. For example, the user may choose to access the same user account from a laptop during working hours (e.g., from 9 am to 12 pm and 1 pm to 5 pm), from a smartphone during lunch break (e.g., from 12 pm to 1 pm) or in the early evening (e.g., from 5 pm to 7 pm), and from a tablet at night (e.g., from 7 pm to 10 pm). After receiving the login request message, the computer server determines a timestamp for the login request message. Note that this timestamp may be generated by the remote terminal and included in the login request message. Or the timestamp is dynamically determined by the server upon receipt of the message. Based on the timestamp, the computer server identifies a pre-authorized terminal for accessing this user account. If the remote terminal corresponds to the pre-authorized terminal (e.g., if they have the same IP or MAC or IMEI number), the computer server then proceeds as described above, e.g., checking whether the message includes a login key. If the remote terminal does not correspond to the pre-authorized terminal, the computer server does not even check whether the login request message includes a login key at all. Rather, the computer server generates a verification code and returns the verification code to the remote terminal. Upon receipt of the verification code, the remote terminal then prompts a user of the remote terminal to return the verification code to the computer server in a predefined format as described above.

In some embodiments, the computer server periodically updates the login key stored at the remote terminal. For example, if it is determined that the first login key was generated more than a predefined time window (e.g., three months) from the timestamp associated with the login request message, the computer server may choose to generate a fourth login key that is different from the second login key and returns the fourth login key to the remote terminal. Upon receipt of the fourth login key, the terminal then generates and stores therein a correspondence relationship between the username and the fourth login key. In other words, a login key generated by the computer server has a limited life expectancy, which may be configurable by the user, and it is set to expire and be replaced with a new login key generated by the computer server to further improve the security of the login process managed by the computer server.

In some embodiments, the computer server determines a location of the remote terminal based on the login request message after receiving the message. Like the timestamp, the user of the user account may register different terminals as pre-authorized terminals for different locations (e.g., office, home, etc.). In this case, the computer server identifies a pre-authorized terminal for accessing the user account based on the determined location. If the remote terminal is different from the pre-authorized terminal, the computer server then generates a verification code and returns the verification code to the remote terminal. Upon receipt of the verification code, the remote terminal then prompts a user of the remote terminal to return the verification code to the computer server in a predefined format as described above.

In some embodiments, the computer server specifies a time window for receiving the verification code from the remote terminal based on an assumption that a normal user should be able to return the verification code between a first time threshold (e.g., 3-5 seconds after receiving the verification code) and a second time threshold (e.g., 8-10 seconds after receiving the verification code). If the remote terminal cannot return the verification code, the computer server then denies the login request message and generates a new verification code and returns the new verification code to the remote terminal. This approach gives the user of the remote terminal a new chance of getting authenticated by the computer server.

Embodiment 2

This embodiment of the present application provides a user account login method.

Figure 2A:
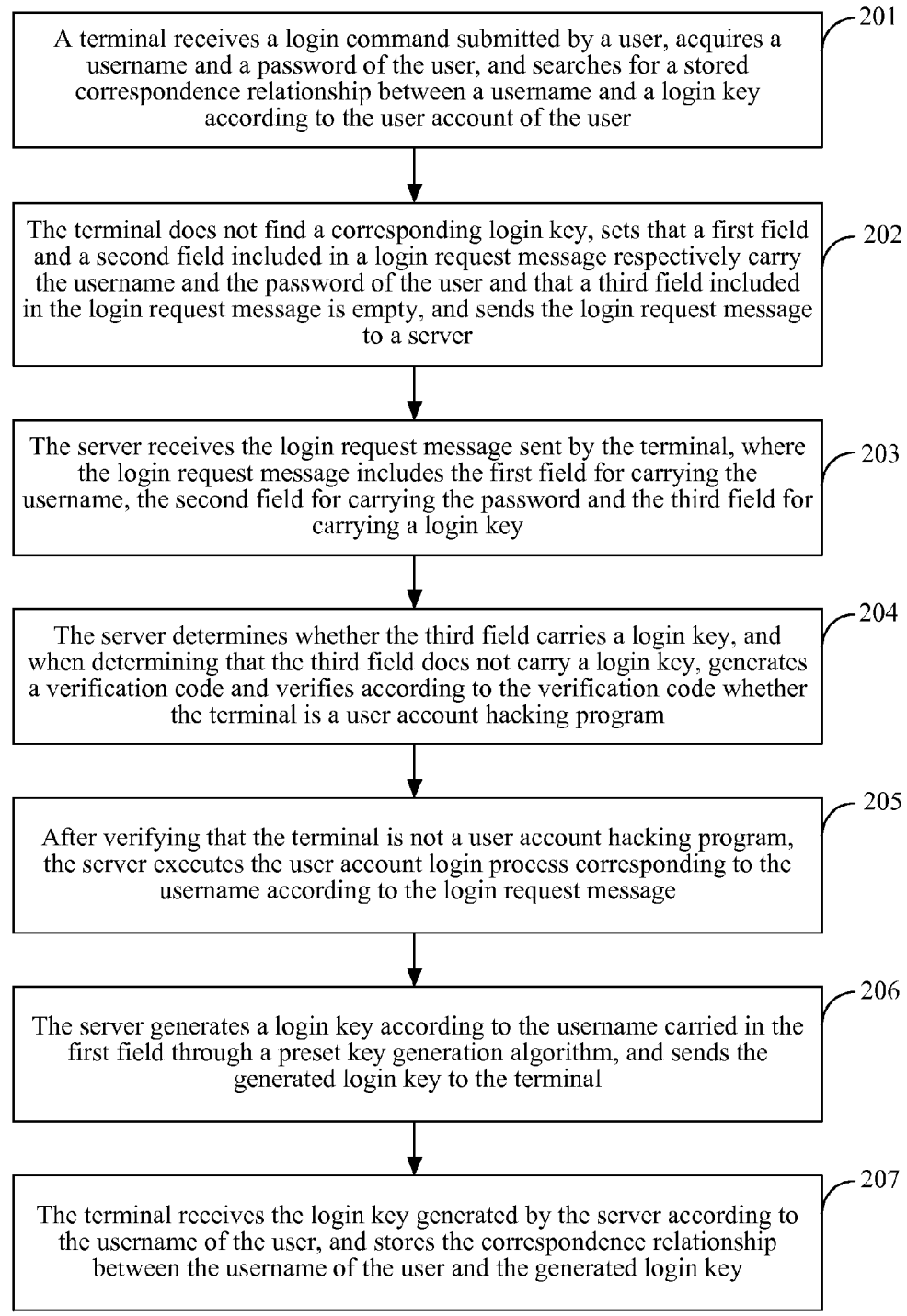
FIG. 2A is a flow chart of a user account login method according to Embodiment 2 of the present application.

Referring to FIG. 2A, when a user logs into a server on a terminal for the first time, Steps 201 to 207 are performed to log into the server, which may include:

Step 201: The terminal receives a login command submitted by the user, acquires a username and a password of the user, and searches for a stored correspondence relationship between the username and a login key associated with the username.

The user respectively inputs the username and the password of the user in a username input box and a password input box included in a login interface, and clicks an OK button to submit the login command to the terminal. The terminal receives the login command submitted by the user, respectively acquires the username and the password of the user from the username input box and the password input box included in the login interface, and searches for the stored correspondence relationship between the username and a login key associated with the username.

Figure 2B:
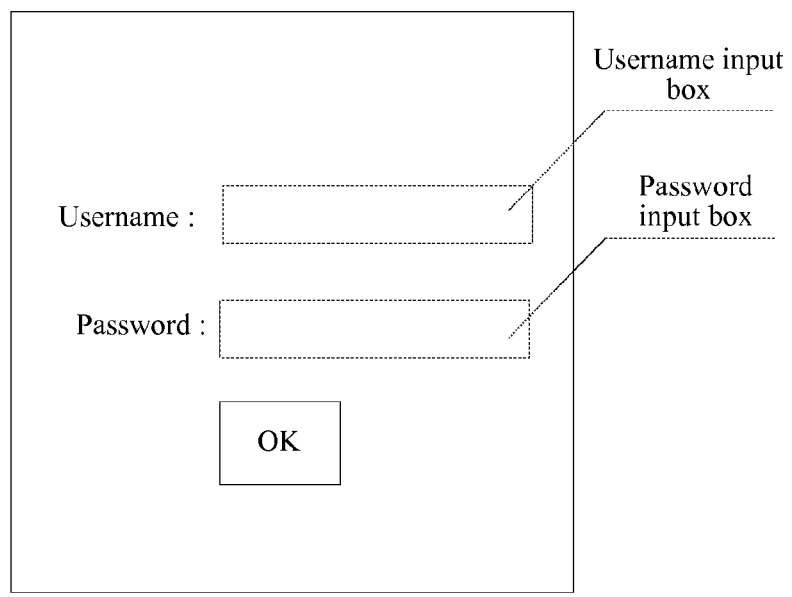
FIG. 2B is a first schematic view of a login interface according to Embodiment 2 of the present application.
Figure 2C:
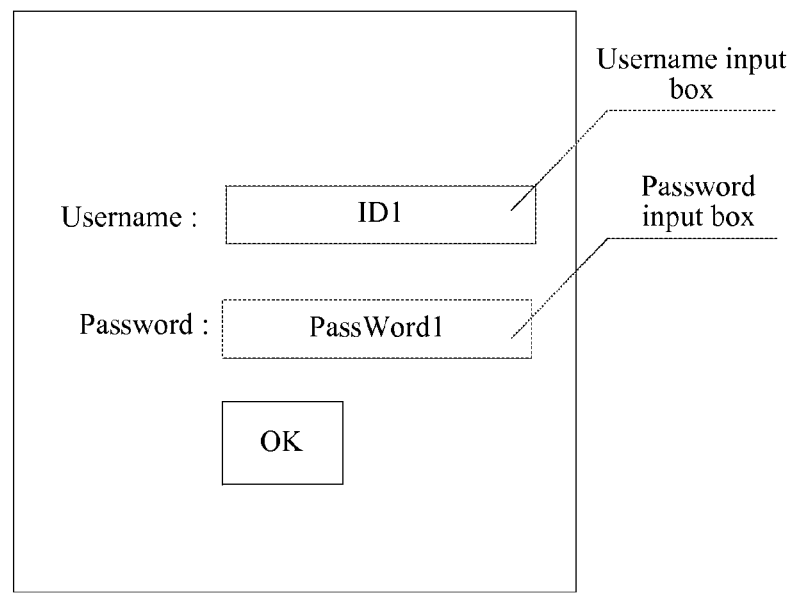
FIG. 2C is a second schematic view of a login interface according to Embodiment 2 of the present application.

For example, a user A respectively inputs a username ID1 and a password Password1 of the user A in a username input box and a password input box included in a login interface shown in FIG. 2B, and clicks an OK button to submit a login command to a terminal. The terminal receives the login command submitted by the user A, respectively acquires the username ID1 and the password Password1 of the user A from the username input box and the password input box included in the login interface shown in FIG. 2C, and searches for a stored correspondence relationship between a username and a login key shown in Table 1 according to the username ID1 of the user A.

TABLE 1

| Username | Login key |
|----------|-----------|
| ID2      | Key2      |
| ...      | ...       |

Step 202: The terminal does not find a corresponding login key, sets that a first field and a second field included in a login request message respectively carry the username and the password of the user and that a third field included in the login request message is empty, and sends the login request message to the server.

For example, the terminal does not find the corresponding login key, sets that the first field and the second field included in the login request message respectively carry the username ID1 and the password Password1 of the user A and that the third field included in the login request message is empty, and sends the login request message to the server.

Step 203: The server receives the login request message sent by the terminal, where the login request message includes the first field for carrying the username, the second field for carrying the password and the third field for carrying the login key.

For example, the server receives the login request message sent by the terminal, where the login request message includes the first field for carrying the username ID1, the second field for carrying the password Password1 and the third field whose content is empty, that is, the third field does not carry a login key.

Step 204: The server determines whether the third field carries a first login key, and when determining that the third field does not carry a login key, generates a verification code and verifies according to the verification code whether the login request message is generated by a user account hacking program.

Specifically, the server determines that the third field does not carry a login key, generates a character string through a preset verification code generation algorithm, converts the generated character string into a verification code in a picture form, and sends the generated picture verification code to the terminal corresponding to the user. The terminal receives the picture verification code sent by the server and displays the picture verification code to the user, so that the user inputs a character string according to the displayed picture verification code and submits a verification command to the terminal by clicking the OK button. The terminal receives the verification command submitted by the user, acquires the character string input by the user, and sends the character string input by the user to the server. The server receives the character string input by the user, and compares the character string in the generated picture verification code with the character string input by the user, where if they are the same, verification succeeds, and it is verified that the user logs into the user account on the terminal, and if they are different, the verification fails, and it is verified that the login request message is generated by a user account hacking program.

If the login request message is generated by a user account hacking program, after receiving the picture verification code, it is impossible for the terminal to read the character string from the picture verification code as a user does, so the verification fails, or it can be considered that the login request message is generated by a user account hacking program if the verification fails several times. When the verification succeeds, it can be determined that the user logs into the user account on the terminal. Besides, as the terminal does not have a login key corresponding to the username of the user, it can indicate that the user logs into the corresponding user account of the user on the terminal for the first time, and after the user logs into the user account for the first time, the server may generate a corresponding login key for the username of the user and sends the login key to the terminal.

For example, the server determines that the third field does not carry a login key, generates a character string "A81y4" through a preset verification code generation algorithm, converts the generated character string "A81y4" into a verification code in a picture form, and sends the generated picture verification code to the terminal corresponding to the user A. The terminal receives the picture verification code sent by the server and displays the picture verification code to the user A, so that the user A inputs a character string "A81y4" according to the displayed picture verification code and submits a verification command to the terminal by clicking the OK button. The terminal receives the verification command submitted by the user A, acquires the character string "A81y4" input by the user, and sends the character string "A81y4" input by the user to the server. The server receives the character string "A81y4" input by the user, compares the character string "A81y4" in the generated picture verification code with the character string "A81y4" input by the user to find that they are the same, so that verification succeeds and it is verified that the user A logs into the user account on the terminal. Also, as the third field does not carry a login key, it is determined that the user A logs into the user account on the terminal for the first time.

Step 205: After verifying that the terminal is not a user account hacking program, the server executes the user account login process corresponding to the user account according to the login request message.

Specifically, after verifying that the terminal is not a user account hacking program, the server acquires, according to the username carried in the first field included in the login request message, a password corresponding to the username from the stored correspondence relationship between a username and a login key, and compares the acquired password with the password carried in the second field, where if they are the same, login succeeds, and if they are different, login fails.

For example, after verifying that the terminal is not a user account hacking program, the server acquires, according to the username ID1 carried in the first field included in the login request message, a password Password2 corresponding to the username ID1 from the stored correspondence relationship between a username and a login key shown in Table 2, and compares the acquired password Password2 with the password Password1 carried in the second field to find that they are the same, so that login succeeds.

TABLE 2

| User account | Password |
|---|---|
| ID1 | Password2 |
| ... | ... |

Step 206: The server generates a login key according to the username carried in the first field through a preset key generation algorithm, and sends the generated login key to the terminal.

For example, after verifying that the user A uses the terminal to log into the user account for the first time, the server generates a login key Key1 according to the username ID1 carried in the first field through the preset key generation algorithm, and sends the generated login key Key1 to the terminal.

Step 207: The terminal receives the login key generated by the server according to the username of the user, and stores a correspondence relationship between the username of the user and the generated login key.

For example, the terminal receives the login key Key1 generated by the server according to the username ID1 of the user A, and stores a correspondence relationship between the username ID1 of the user A and the generated login key Key1, as shown in Table 3.

TABLE 3

| User account | Login key |
|---|---|
| ID2 | Key2 |
| ID1 | Key1 |
| ... | ... |

Figure 2D:
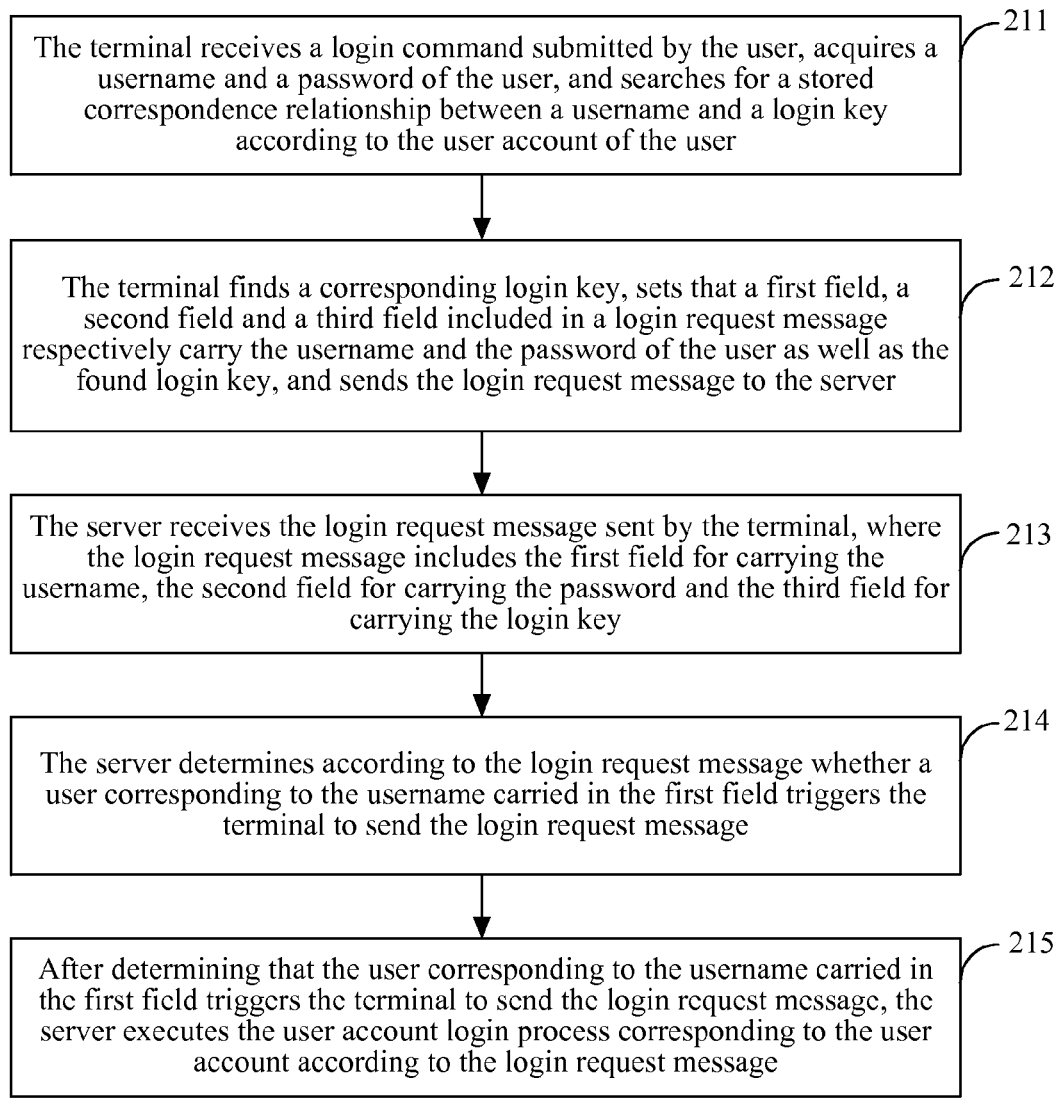
FIG. 2D is a flow chart of a user account login method according to Embodiment 2 of the present application.

Referring to FIG. 2D, when a user logs into a server on a terminal once again, Steps 211 to 215 are performed to log into the server, which may include:

Step 211: The terminal receives a login command submitted by the user, acquires a username and a password of the user, and searches for a stored correspondence relationship between the username and a login key associated with the username.

The user respectively inputs the username and password of the user in a username input box and a password input box included in a login interface, and clicks an OK button to submit the login command to the terminal. The terminal receives the login command submitted by the user, respectively acquires the username and the password of the user from the username input box and the password input box included in the login interface, and searches for the stored correspondence relationship between the username and a login key associated with the username.

For example, the user A respectively inputs the username ID1 and the password Password1 of the user in the username input box and the password input box included in the login interface shown in FIG. 2B, and clicks the OK button to submit the login command to the terminal. The terminal receives the login command submitted by the user A, respectively acquires the username ID1 and the password Password1 of the user A from the username input box and the password input box included in the login interface shown in FIG. 2C, and searches for the stored correspondence relationship between a username and a login key shown in Table 3 according to the username ID1 of the user A.

Step 212: The terminal finds the corresponding login key, sets that a first field, a second field and a third field included in a login request message respectively carry the username and the password of the user as well as the found login key, and sends the login request message to the server.

For example, the terminal finds a corresponding login key Key1, sets that the first field, the second field and the third field included in the login request message respectively carry the username ID1 and the password Password1 of the user A as well as the found login key Key1, and sends the login request message to the server.

Step 213: The server receives the login request message sent by the terminal, where the login request message includes the first field for carrying the username, the second field for carrying the password and the third field for carrying the login key.

For example, the server receives the login request message sent by the terminal, where the login request message includes the first field for carrying the username ID1, the second field for carrying the password Password1 and the third field for carrying the login key Key1.

Step 214: The server determines according to the login request message whether the user corresponding to the username carried in the first field triggers the terminal to send the login request message.

Specifically, the server determines that the third field carries a first login key, generates a login key according to the username carried in the first field through a preset key generation algorithm; compares the generated login key with the login key carried in the third field, if the second login key corresponds to the first login key, e.g., if they are the same, determines that the user corresponding to the username carried in the first field triggers the terminal to send the login request message, and if they are different, determines that the login request message is generated by a user account hacking program.

After the user logs into the user account on the terminal for the first time, the server generates a corresponding login key for the username of the user and sends the login key to the terminal, and the terminal stores a correspondence relationship between the username of the user and the login key. Therefore, if the user corresponding to the username carried in the first field triggers the terminal to send the login request message, the third field included in the login request message carries the login key. The second login key and the first login key carried in the third field are compared, and if the second login key corresponds to the first login key, e.g., if they are the same, it can be determined that the user corresponding to the username carried in the first field triggers the terminal to send the login request message. If the login request message is generated by a user account hacking program, it is impossible for the terminal to acquire a login key corresponding to the username from the stored correspondence relationship between the username of the user and the login key as the terminal corresponding to the user does. Therefore, the second login key and the first login key carried in the third field are compared, and if they are different, it can be determined that the login request message is generated by a user account hacking program.

For example, the server determines that the third field carries a first login key, and generates a login key Key3 according to the username ID1 carried in the first field through the preset key generation algorithm; compares the second login key Key3 with the first login key Key1 carried in the third field, and if the second login key corresponds to the first login key, e.g., if they are the same, determines that the user A corresponding to the username ID1 carried in the first field triggers the terminal to send the login request message.

Step 215: After determining that the user corresponding to the username carried in the first field triggers the terminal to send the login request message, the server executes the user account login process corresponding to the user account according to the login request message.

Specifically, after determining that the user corresponding to the username carried in the first field triggers the terminal to send the login request message, the server acquires a password corresponding to the user account from a stored correspondence relationship between a username and a password according to the username carried in the first field included in the login request message, and compares the acquired password with the password carried in the second field, where if they are the same, login succeeds, and if they are different, login fails.

For example, after determining that the user A corresponding to the username ID1 carried in the first field triggers the terminal to send the login request message, the server acquires the password Password2 corresponding to the username ID1 from a stored correspondence relationship between a username and a password shown in Table 2 according to the username ID1 carried in the first field included in the login request message, and compares the acquired password Password2 with the password Password1 carried in the second field, where if they are the same, login succeeds.

In this embodiment of the present application, a server receives a login request message sent by a terminal, where the login request message includes a first field for carrying a username, a second field for carrying a password and a third field for carrying a login key; determines according to the login request message whether a user corresponding to the username carried in the first field triggers the terminal to send the login request message; and after determining that the user corresponding to the username carried in the first field triggers the terminal to send the login request message, executes the user account login process corresponding to the user account according to the login request message. As it can be determined whether the user corresponding to the username carried in the first field triggers the terminal to send the login request message according to the login request message, it can be further determined whether the login request message is generated by a user account hacking program, so as to prevent a user account hacking program from taking advantage of an existing login method to try out a user's username and password, thereby protecting the user's account security.

Embodiment 3

Figure 3:
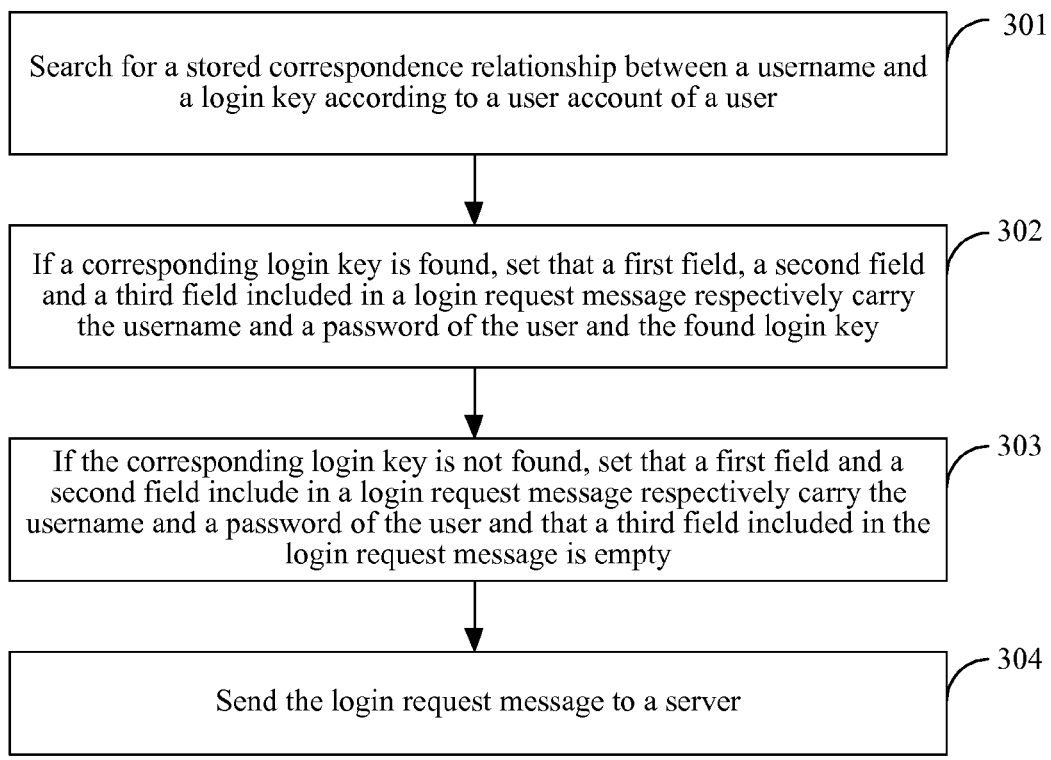
FIG. 3 is a flow chart of a user account login method according to Embodiment 3 of the present application.

Referring to FIG. 3, this embodiment of the present application provides a user account login method, including:

Step 301: searching for a stored correspondence relationship between a username and a login key according to a username of a user;

Step 302: if a corresponding login key is found, setting that a first field, a second field and a third field included in a login request message respectively carry the username and the password of the user and the found login key;

Step 303: if a corresponding login key is not found, setting that a first field and a second field included in a login request message respectively carry the username and the password of the user and that a third field included in the login request message is empty; and Step 304: sending the login request message to a server.

Further, the method further includes:

if the corresponding login key is not found, receiving a login key generated by the server according to the username of the user, and storing a correspondence relationship between the username of the user and the generated login key.

In this embodiment of the present application, a stored correspondence relationship between a username and a login key is searched for according to the username of a user; if a corresponding login key is found, it is set that a first field, a second field and a third field included in a login request message respectively carry the username and the password of the user and the found login key; if a corresponding login key is not found, it is set that a first field and a second field included in a login request message respectively carry the username and the password of the user and that a third field included in the login request message is empty; and the login request message is sent to a server. As the third field included in the login request message carries a login key, it can be determined whether the user corresponding to the username carried in the first field triggers a terminal to send the login request message according to the login key, and it can be further determined whether the login request message is generated by a user account hacking program, so as to prevent a user account hacking program from taking advantage of an existing login method to try out a user's username and password, thereby protecting the user's account security.

Embodiment 4

Figure 4:
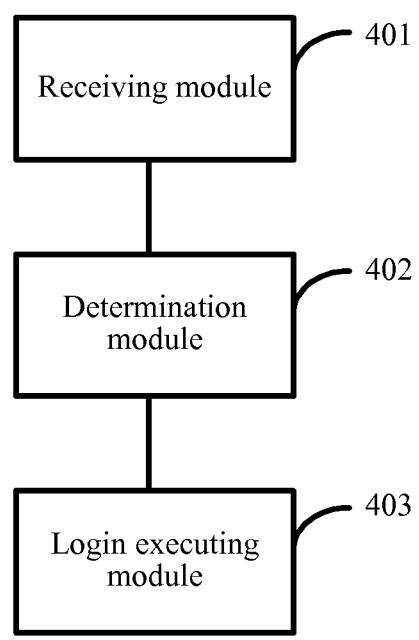
FIG. 4 is a schematic structural view of an account login apparatus according to Embodiment 4 of the present application.

Referring to FIG. 4, this embodiment of the present application provides an account login apparatus, including:

a receiving module 401, used for receiving a login request message sent by a terminal, where the login request message includes a first field for carrying a username, a second field for carrying a password and a third field for carrying a login key;

a determination module 402, used for determining according to the login request message whether a user corresponding to the username carried in the first field triggers the terminal to send the login request message; and a login executing module 403, used for, if yes, executing the user account login process corresponding to the user account according to the login request message.

When the user logs into a server on the terminal for the first time, the determination module 402 determines whether the third field carries a first login key, and when determining that the third field does not carry a login key, generates a verification code and verifies according to the verification code whether the login request message is generated by a user account hacking program. After the determination module 402 verifies that the terminal is not a user account hacking program, the login executing module 403 executes the user account login process corresponding to the user account according to the login request message, generates a login key according to the username carried in the first field through a preset key generation algorithm, and sends the generated login key to the terminal.

When the user logs into a server on the terminal once again, the determination module 402 determines according to the login request message whether the user corresponding to the username carried in the first field triggers the terminal to send the login request message; and after the determination module 402 determines that the user corresponding to the username carried in the first field triggers the terminal to send the login request message, the login executing module 403 executes the user account login process corresponding to the user account according to the login request message.

The determination module 402 includes:

a determination unit, used for determining whether the third field carries a first login key, where the username of the user corresponds to a login key, and the login key corresponding to the username is generated by the server according to the username of the user through the preset key generation algorithm when the user logs into the user account on the terminal for the first time;

a generation unit, used for, if the third field carries a first login key, generating a second login key by applying a preset key generation algorithm to the username; and a comparison and determination unit, used for comparing the second login key with the first login key, and if the second login key corresponds to the first login key, e.g., if they are the same, determining that the user corresponding to the username carried in the first field triggers the terminal to send the login request message.

The determination module 402 is further used for, if the third field does not carry a login key, generating a verification code and verifying according to the verification code whether the login request message is generated by a user account hacking program.

The determination module 402 is further used for, if the terminal is not a user account hacking program, generating a third login key by applying a preset key generation algorithm to the username, and sending the third login key to the terminal.

In this embodiment of the present application, a login request message sent by a terminal is received, where the login request message includes a first field for carrying a username, a second field for carrying a password and a third field for carrying a login key; it is determined according to the login request message whether a user corresponding to the username carried in the first field triggers the terminal to send the login request message; and if yes, the user account login process corresponding to the user account is executed according to the login request message. As it can be determined whether the user corresponding to the username carried in the first field triggers the terminal to send the login request message according to the login request message, it can be further determined whether the login request message is generated by a user account hacking program, so as to prevent a user account hacking program from taking advantage of an existing login method to try out a user's username and password, thereby protecting the user's account security.

Embodiment 5

Figure 5:
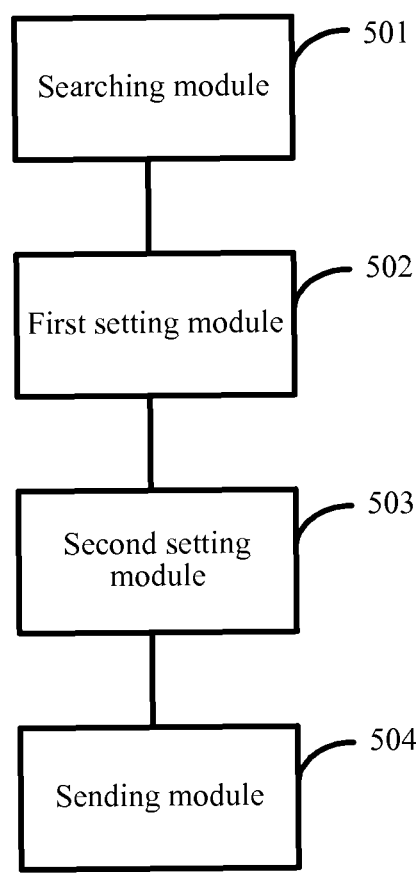
FIG. 5 is a schematic structural view of an account login apparatus according to Embodiment 5 of the present application.

Referring to FIG. 5, this embodiment of the present application provides an account login apparatus, including:

a searching module 501, used for searching for a stored correspondence relationship between a username and a login key according to the username of a user;

a first setting module 502, used for, if a corresponding login key is found, setting that a first field, a second field and a third field included in a login request message respectively carry the username and the password of the user and the found login key;

a second setting module 503, used for, if a corresponding login key is not found, setting that a first field and a second field included in a login request message respectively carry the username and the password of the user and that a third field included in the login request message is empty; and a sending module 504, used for sending the login request message to a server.

When the user logs into the server on a terminal for the first time, the terminal receives a login command submitted by the user, and acquires the username and the password of the user, the searching module 501 searches for the stored correspondence relationship between the username and a login key associated with the username; if the searching module 501 does not find the corresponding login key, the second setting module 503 sets that the first field and the second field included in the login request message respectively carry the username and the password of the user and that the third field included in the login request message is empty, and the sending module 504 sends the login request message to the server.

When the user logs into the server on a terminal once again, the terminal receives a login command submitted by the user, and acquires the username and the password of the user, the searching module 501 searches for the stored correspondence relationship between the username and a login key associated with the username; if the searching module 501 finds the corresponding login key, the first setting module 502 sets that the first field, the second field and the third field included in the login request message respectively carry the username and the password of the user and the found login key, and the sending module 504 sends the login request message to the server.

Further, the apparatus further includes:

a receiving and storage module, used for, if the corresponding login key is not found, receiving a login key generated by the server according to the username of the user, and storing a correspondence relationship between the username of the user and the generated login key.

In this embodiment of the present application, a stored correspondence relationship between a username and a login key is searched for according to the username of a user; if a corresponding login key is found, it is set that a first field, a second field and a third field included in a login request message respectively carry the username and the password of the user and the found login key; if a corresponding login key is not found, it is set that a first field and a second field included in a login request message respectively carry the username and the password of the user and that a third field included in the login request message is empty; and the login request message is sent to a server. As the third field included in the login request message carries a login key, it can be determined according to the login key whether the user corresponding to the username carried in the first field triggers the terminal to send the login request message, and it can be further determined whether the login request message is generated by a user account hacking program, so as to prevent a user account hacking program from taking advantage of an existing login method to try out a user's username and password, thereby protecting the user's account security.

Figure 6:
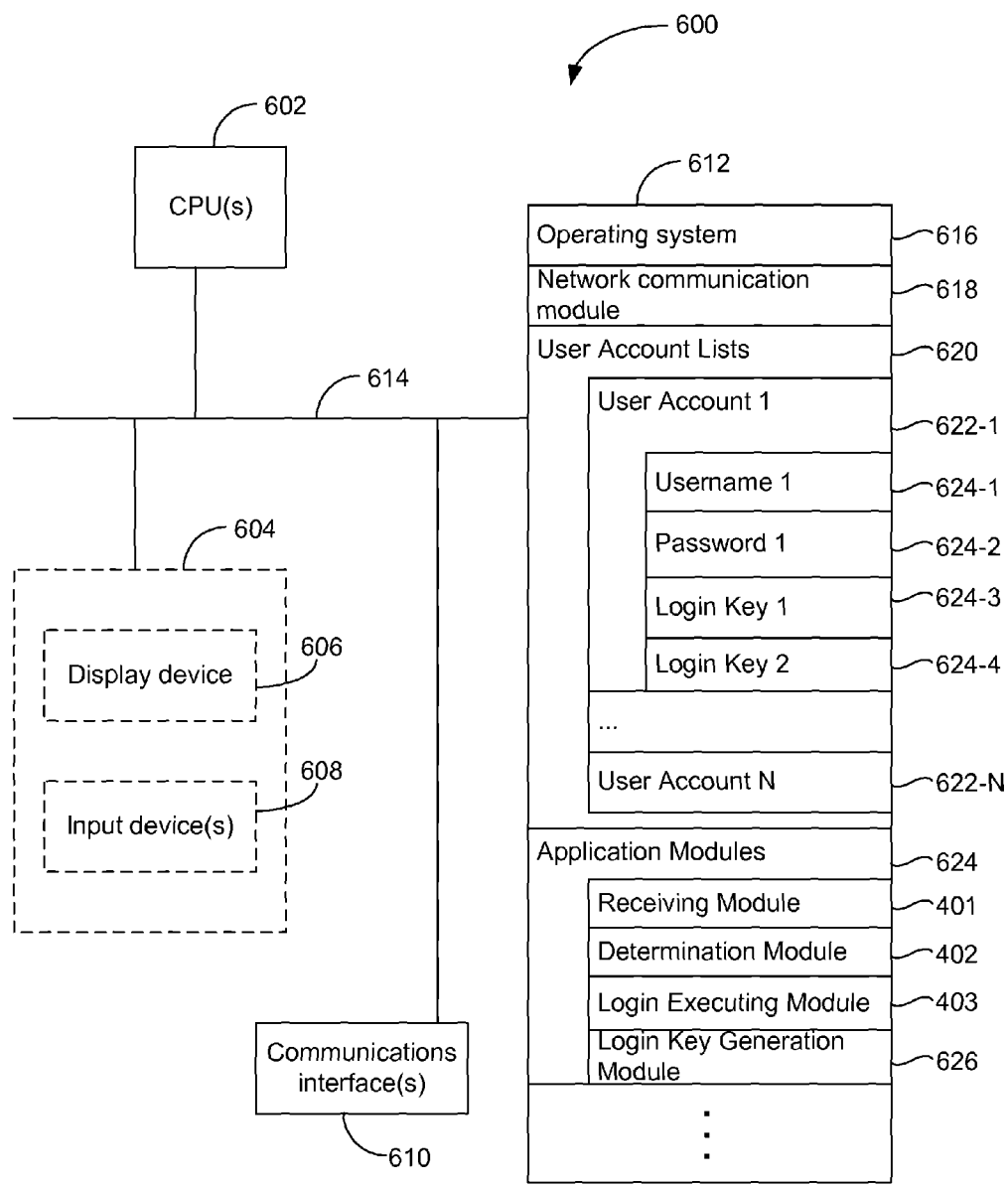
FIG. 6 is a block diagram illustrating a server in accordance with some embodiments of the present application.

FIG. 6 is a block diagram illustrating a computer server 600 in accordance with some embodiments of the present application. The computer server 600 typically includes one or more processing units (CPU's) 602 for executing modules, programs and/or instructions stored in memory 612 and thereby performing processing operations; one or more network or other communications interfaces 610; memory 612; and one or more communication buses 614 for interconnecting these components. The communication buses 614 optionally include circuitry (sometimes called a chipset) that interconnects and controls communications between system components. The computer server 600 optionally includes a user interface 604 comprising a display device 606 and one or more input device(s) (e.g., keyboard, mouse, touch-sensitive surface) 608. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices remotely located from the CPU(s) 602. Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 616 that includes procedures for handling various basic system services and for performing hardware dependent tasks;
- a network communication module 618 that is used for connecting the computer server 600 to other computers (e.g., a remote terminal) via the one or more communication network interfaces 610 (wired or wireless) and one or more communication networks, such as the Internet, other wide area networks, local area networks, metropolitan area networks, and so on;
- user account lists 620 that lists respective user account for a respective service provided by the computer server 600, each user account (622-1, 622-N) further including a user name 624-1, a password 624-2, and one or more terminal IDs 624-3 and 624-4, each ID having associated time window and location information as described above for determining whether a remote terminal is a pre-authorized terminal or not; and
- one or more application modules 624 including a receiving module 401, a determination module 402, a login executing module 403, and a login key generation module 6026 as described above in connection with FIGS. 1-5.

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "server," FIG. 6 is intended more as functional description of the various features which may be present in a set of client devices than as a structural schematic of the embodiments described herein. In practice, and as recognized by those of ordinary skill in the art, items shown separately could be combined and some items could be separated. For example, the user account lists 620 and the application modules 624 may be stored in a distributed server system.

Figure 7:
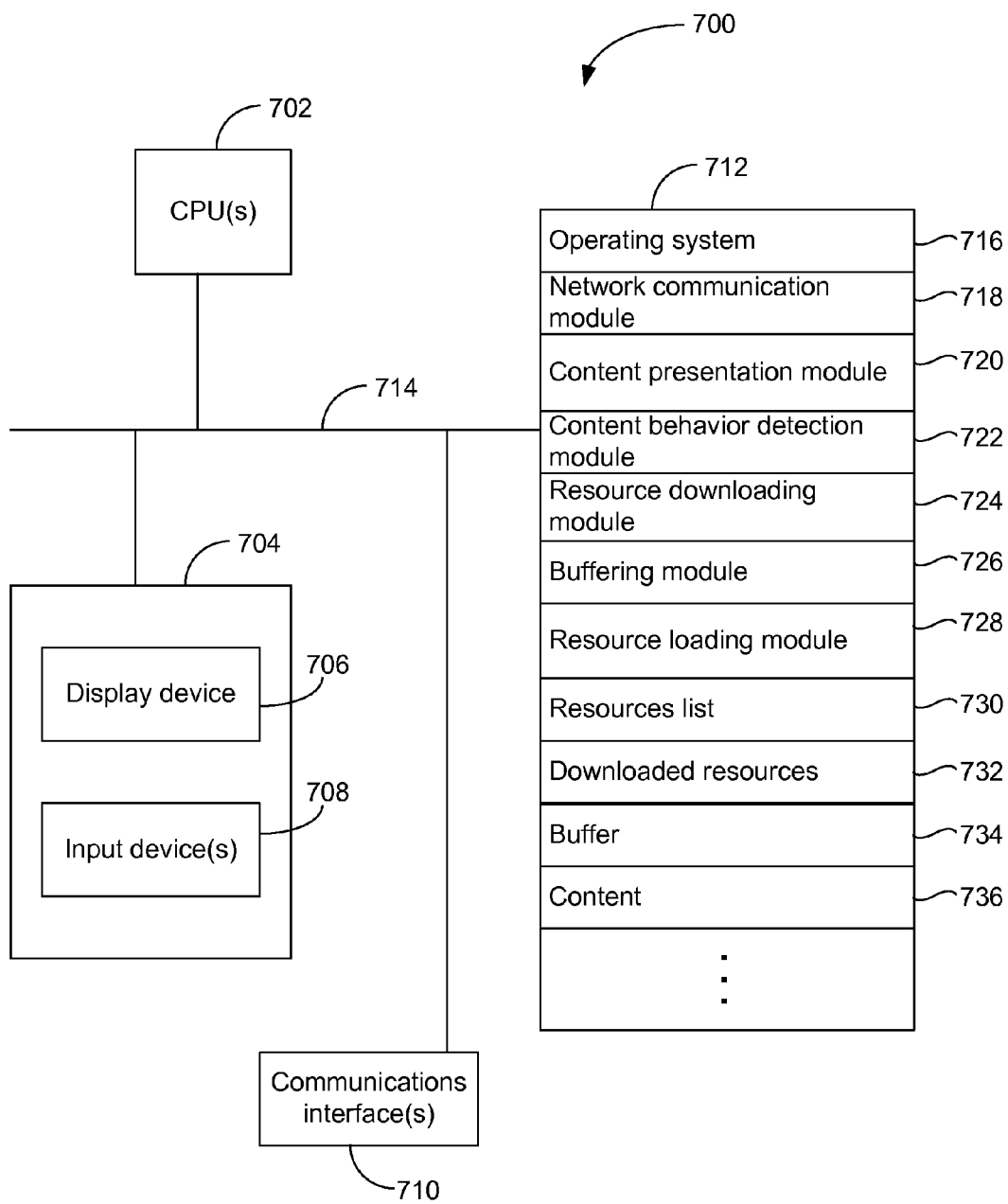
FIG. 7 is a block diagram illustrating a client device in accordance with some embodiments of the present application.

FIG. 7 is a block diagram illustrating a client device 700 as a terminal in accordance with some embodiments of the present application. The client device 700 typically includes one or more processing units (CPU's) 702 for executing modules, programs and/or instructions stored in memory 712 and thereby performing processing operations; one or more network or other communications interfaces 710; memory 712; and one or more communication buses 714 for interconnecting these components. The communication buses 714 optionally include circuitry (sometimes called a chipset) that interconnects and controls communications between system components. The client device 500 includes a user interface 704 comprising a display device 706 and one or more input device(s) (e.g., keyboard, mouse, touch-sensitive surface) 708. In some embodiments, an input device 708 is integrated with the display device 706. For example, a touch screen includes a touch-sensitive surface integrated with the display device 706. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a non-transitory computer readable storage medium. In some embodiments, memory 712, or the computer readable storage medium of memory 712 stores the following programs, modules and data structures, or a subset thereof:

- an operating system 716 that includes procedures for handling various basic system services and for performing hardware dependent tasks;
- a network communication module 718 that is used for connecting the client device 700 to other computers (e.g., the computer server 600) via the one or more communication network interfaces 710 (wired or wireless) and one or more communication networks, such as the Internet, other wide area networks, local area networks, metropolitan area networks, and so on;
- a login module 720 for enabling a user to log into a user account as described above in connection with FIGS. 1-5;
- a location module 722 for determining a current location of the client device 500 (e.g., a GPS module); and
- a username-login key map 724 for managing the correspondence relationship between a username 726 and a corresponding login key 728.

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Although FIG. 7 shows a "client device," FIG. 7 is intended more as functional description of the various features which may be present in a set of client devices than as a structural schematic of the embodiments described herein. In practice, and as recognized by those of ordinary skill in the art, items shown separately could be combined and some items could be separated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method for authenticating a login request from a remote terminal, the method comprising:
at a computer server having one or more processors and memory storing program modules to be executed by the one or more processors:
receiving a login request message sent by a remote terminal to access a user account, where the login request message includes a first field for carrying a username, a second field for carrying a password and a third field for carrying a login key;
in accordance with a determination that there is a first login key found in the third field of the login request message:
generating a second login key by applying a preset key generation algorithm to the username; and
executing a user account login process using the username and the password after confirming that the second login key corresponds to the first login key found in the third field of the login request message;
in accordance with a determination that there is no login key found in the third field of the login request message:
generating a verification code and returning the verification code to the remote terminal, wherein the remote terminal is configured to prompt a user of the remote terminal to return the verification code to the computer server in a predefined format;
executing the user account login process using the username and the password after confirming that the returned verification code corresponds to the server-generated verification code;
generating a third login key by applying the preset key generation algorithm to the username; and
returning the third login key to the remote terminal, wherein the remote terminal is configured to store a correspondence relationship between the username and the third login key.

2. The method of claim 1, further comprising:
after receiving the login request message:
determining a timestamp for the login request message;
identifying a pre-authorized terminal for accessing the user account based on the timestamp;
generating a verification code and returning the verification code to the remote terminal if the remote terminal does not correspond to the pre-authorized terminal, wherein the remote terminal is configured to prompt a user of the remote terminal to return the verification code to the computer server in a predefined format;
determining whether there is a login key found in the third field of the login request message if the remote terminal corresponds to the pre-authorized terminal.

3. The method of claim 2, further comprising:
after confirming that the second login key corresponds to the first login key:
generating a fourth login key by applying the preset key generation algorithm to the username if the first login key was generated more than a predefined time window from the timestamp, the fourth login key is different from the second login key; and
returning the fourth login key to the remote terminal, wherein the remote terminal is configured to store a correspondence relationship between the username and the fourth login key.

4. The method of claim 1, further comprising:
after receiving the login request message:
determining a location of the remote terminal based on the login request message;
identifying a pre-authorized terminal for accessing the user account based on the determined location;
generating a verification code and returning the verification code to the remote terminal if the remote terminal does not correspond to the pre-authorized terminal, wherein the remote terminal is configured to prompt a user of the remote terminal to return the verification code to the computer server in a predefined format;

determining whether there is a login key found in the third field of the login request message if the remote terminal corresponds to the pre-authorized terminal.

5. The method of claim 1, further comprising:
after returning the verification code to the remote terminal:
denying the login request message if the remote terminal returns the verification code in the predefined format outside a predefined time window; and
generating a new verification code and returning the new verification code to the remote terminal, wherein the remote terminal is configured to prompt a user of the remote terminal to return the new verification code to the computer server in the predefined format.

6. The method of claim 1, wherein the remote terminal is configured to prompt the user to read the verification code so that the remote terminal records the verification code in an audio file and returns the audio file to the computer server.

7. A computer server comprising:
one or more processors;
memory; and
one or more program modules stored in the memory and to be executed by the one or more processors, the program modules further including instructions for:
receiving a login request message sent by a remote terminal to access a user account, where the login request message includes a first field for carrying a username, a second field for carrying a password and a third field for carrying a login key;
in accordance with a determination that there is a first login key found in the third field of the login request message:
generating a second login key by applying a preset key generation algorithm to the username; and
executing a user account login process using the username and the password after confirming that the second login key corresponds to the first login key found in the third field of the login request message;
in accordance with a determination that there is no login key found in the third field of the login request message:
generating a verification code and returning the verification code to the remote terminal, wherein the remote terminal is configured to prompt a user of the remote terminal to return the verification code to the computer server in a predefined format;
executing the user account login process using the username and the password after confirming that the returned verification code corresponds to the server-generated verification code;
generating a third login key by applying the preset key generation algorithm to the username; and
returning the third login key to the remote terminal, wherein the remote terminal is configured to store a correspondence relationship between the username and the third login key.

8. The computer server of claim 7, wherein the program modules further include instructions for:
after receiving the login request message:
determining a timestamp for the login request message;
identifying a pre-authorized terminal for accessing the user account based on the timestamp;
generating a verification code and returning the verification code to the remote terminal if the remote terminal does not correspond to the pre-authorized terminal, wherein the remote terminal is configured to prompt a user of the remote terminal to return the verification code to the computer server in a predefined format;
determining whether there is a login key found in the third field of the login request message if the remote terminal corresponds to the pre-authorized terminal.

9. The computer server of claim 8, wherein the program modules further include instructions for:
after confirming that the second login key corresponds to the first login key:
generating a fourth login key by applying the preset key generation algorithm to the username if the first login key was generated more than a predefined time window from the timestamp, the fourth login key is different from the second login key; and
returning the fourth login key to the remote terminal, wherein the remote terminal is configured to store a correspondence relationship between the username and the fourth login key.

10. The computer server of claim 7, wherein the program modules further include instructions for:
after receiving the login request message:
determining a location of the remote terminal based on the login request message;
identifying a pre-authorized terminal for accessing the user account based on the determined location;
generating a verification code and returning the verification code to the remote terminal if the remote terminal does not correspond to the pre-authorized terminal, wherein the remote terminal is configured to prompt a user of the remote terminal to return the verification code to the computer server in a predefined format;
determining whether there is a login key found in the third field of the login request message if the remote terminal corresponds to the pre-authorized terminal.

11. The computer server of claim 7, wherein the program modules further include instructions for:
after returning the verification code to the remote terminal:
denying the login request message if the remote terminal returns the verification code in the predefined format outside a predefined time window; and
generating a new verification code and returning the new verification code to the remote terminal, wherein the remote terminal is configured to prompt a user of the remote terminal to return the new verification code to the computer server in the predefined format.

12. The computer server of claim 7, wherein the remote terminal is configured to prompt the user to read the verification code so that the remote terminal records the verification code in an audio file and returns the audio file to the computer server.

13. A non-transitory computer readable storage medium, storing one or more program modules for execution by one or more processors of a computer server, the one or more program modules including instructions for:
receiving a login request message sent by a remote terminal to access a user account, where the login request message includes a first field for carrying a username, a second field for carrying a password and a third field for carrying a login key;
in accordance with a determination that there is a first login key found in the third field of the login request message:

generating a second login key by applying a preset key generation algorithm to the username; and executing a user account login process using the username and the password after confirming that the second login key corresponds to the first login key found in the third field of the login request message;

in accordance with a determination that there is no login key found in the third field of the login request message:

generating a verification code and returning the verification code to the remote terminal, wherein the remote terminal is configured to prompt a user of the remote terminal to return the verification code to the computer server in a predefined format;

executing the user account login process using the username and the password after confirming that the returned verification code corresponds to the server-generated verification code;

generating a third login key by applying the preset key generation algorithm to the username; and returning the third login key to the remote terminal, wherein the remote terminal is configured to store a correspondence relationship between the username and the third login key.

14. The non-transitory computer readable storage medium of claim 13, wherein the program modules further include instructions for:

after receiving the login request message:

determining a timestamp for the login request message;

identifying a pre-authorized terminal for accessing the user account based on the timestamp;

generating a verification code and returning the verification code to the remote terminal if the remote terminal does not correspond to the pre-authorized terminal, wherein the remote terminal is configured to prompt a user of the remote terminal to return the verification code to the computer server in a predefined format;

determining whether there is a login key found in the third field of the login request message if the remote terminal corresponds to the pre-authorized terminal.

15. The non-transitory computer readable storage medium of claim 14, wherein the program modules further include instructions for:

after confirming that the second login key corresponds to the first login key:

generating a fourth login key by applying the preset key generation algorithm to the username if the first login key was generated more than a predefined time window from the timestamp, the fourth login key is different from the second login key; and returning the fourth login key to the remote terminal, wherein the remote terminal is configured to store a correspondence relationship between the username and the fourth login key.

16. The non-transitory computer readable storage medium of claim 13, wherein the program modules further include instructions for:

after receiving the login request message:

determining a location of the remote terminal based on the login request message;

identifying a pre-authorized terminal for accessing the user account based on the determined location;

generating a verification code and returning the verification code to the remote terminal if the remote terminal does not correspond to the pre-authorized terminal, wherein the remote terminal is configured to prompt a user of the remote terminal to return the verification code to the computer server in a predefined format;

determining whether there is a login key found in the third field of the login request message if the remote terminal corresponds to the pre-authorized terminal.

17. The non-transitory computer readable storage medium of claim 13, wherein the program modules further include instructions for:

after returning the verification code to the remote terminal:

denying the login request message if the remote terminal returns the verification code in the predefined format outside a predefined time window; and generating a new verification code and returning the new verification code to the remote terminal, wherein the remote terminal is configured to prompt a user of the remote terminal to return the new verification code to the computer server in the predefined format.

18. The non-transitory computer readable storage medium of claim 13, wherein the remote terminal is configured to prompt the user to read the verification code so that the remote terminal records the verification code in an audio file and returns the audio file to the computer server.

* * * * *